United States Patent [19]

Smith

[11] 3,845,532

[45] Nov. 5, 1974

[54] TURRET LATHE

[75] Inventor: William R. Smith, Springfield, Vt.

[73] Assignee: Textron, Inc., Providence, R.I.

[22] Filed: Apr. 19, 1973

[21] Appl. No.: 352,671

Related U.S. Application Data

[62] Division of Ser. No. 125,162, March 17, 1971, Pat. No. 3,750,244.

[52] U.S. Cl. .................................... 29/40, 408/35
[51] Int. Cl. ........................ B23b 3/18, B23b 39/20
[58] Field of Search .................. 408/35, 117; 29/40

[56] References Cited
UNITED STATES PATENTS

| | | | |
|---|---|---|---|
| 1,530,819 | 3/1925 | Ensign | 408/35 |
| 2,952,170 | 9/1960 | Hansen et al. | 408/35 |
| 2,991,666 | 7/1961 | Charlat | 408/35 |
| 3,203,071 | 8/1965 | Uchida | 408/35 |

Primary Examiner—Francis S. Husar
Attorney, Agent, or Firm—DeLio and Montgomery

[57] ABSTRACT

This disclosure relates to a turret lathe having full production capabilities. A turret carrying a plurality of drivable end working tools is selectively indexable and a single drive means is arranged to be coupled to and uncoupled from each drivable tool when indexed to an operative position. The spindle is arranged to be driven at turning speeds for operation with turning tools, and also at feed speeds in conjunction with the end working tools so that irregular contours, slots, indentions, etc. may be machined in the end face and also the peripheries of a workpiece. The end working tools may also perform drilling, boring and tapping operations on the workpiece as it is indexed to position.

5 Claims, 15 Drawing Figures

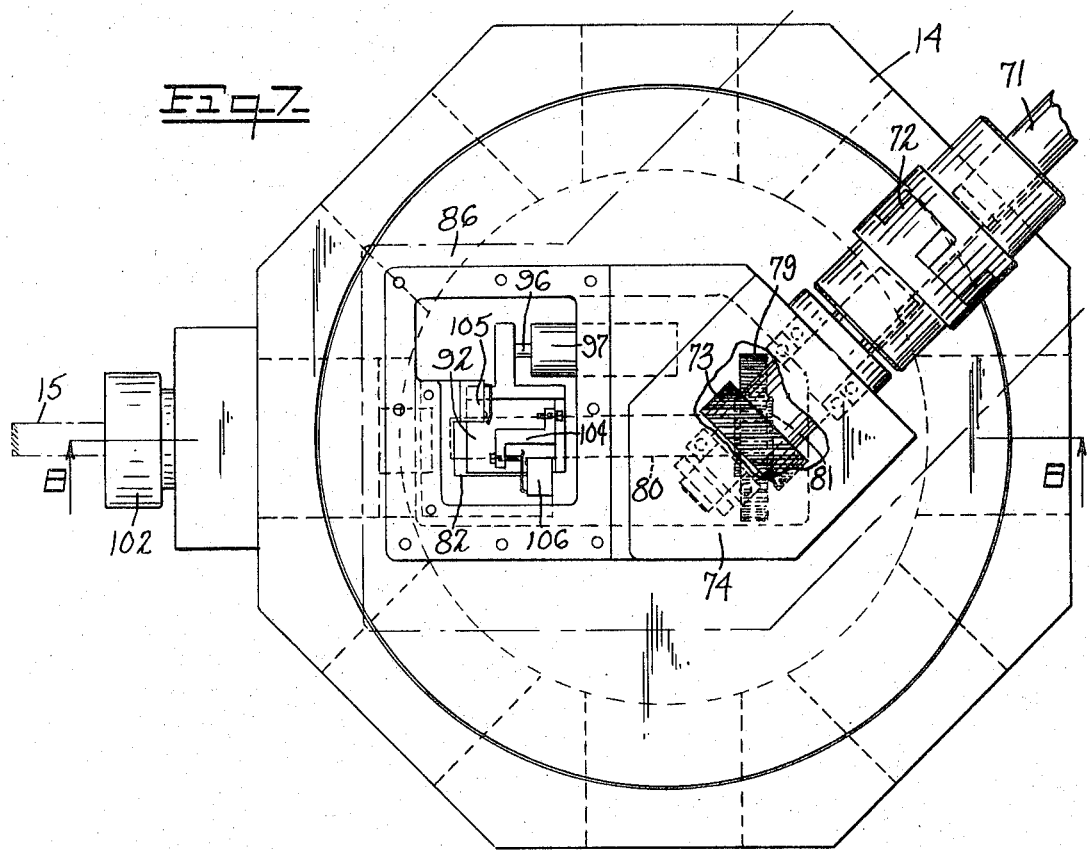
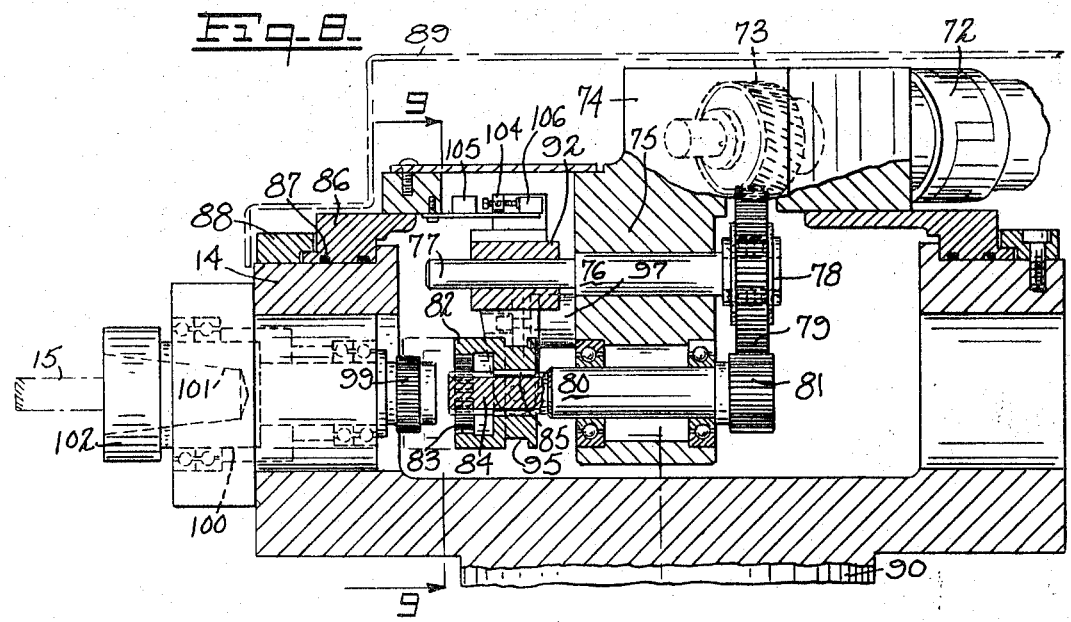

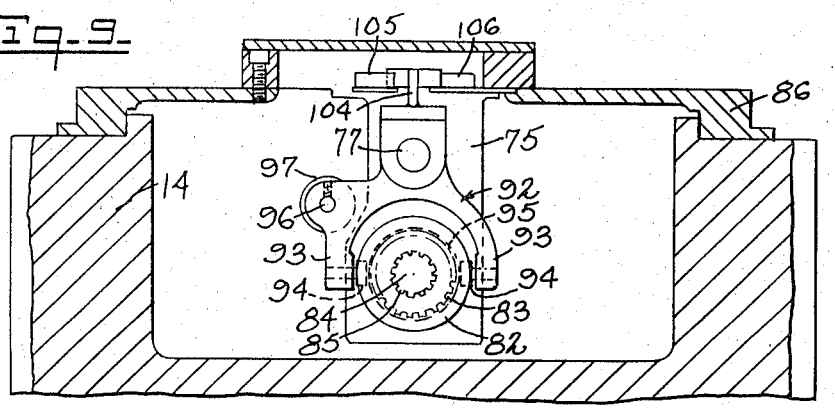
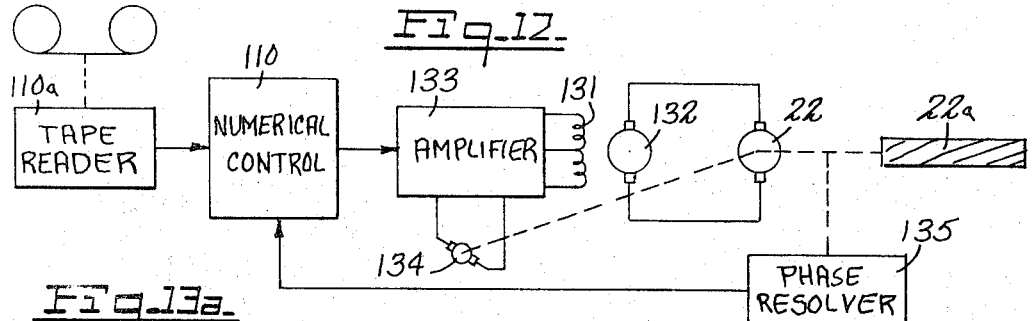
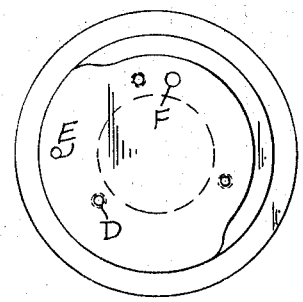
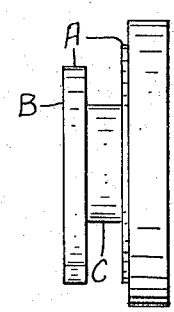
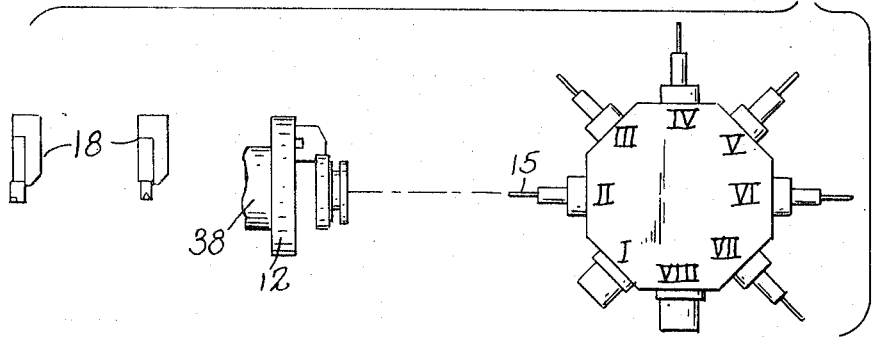

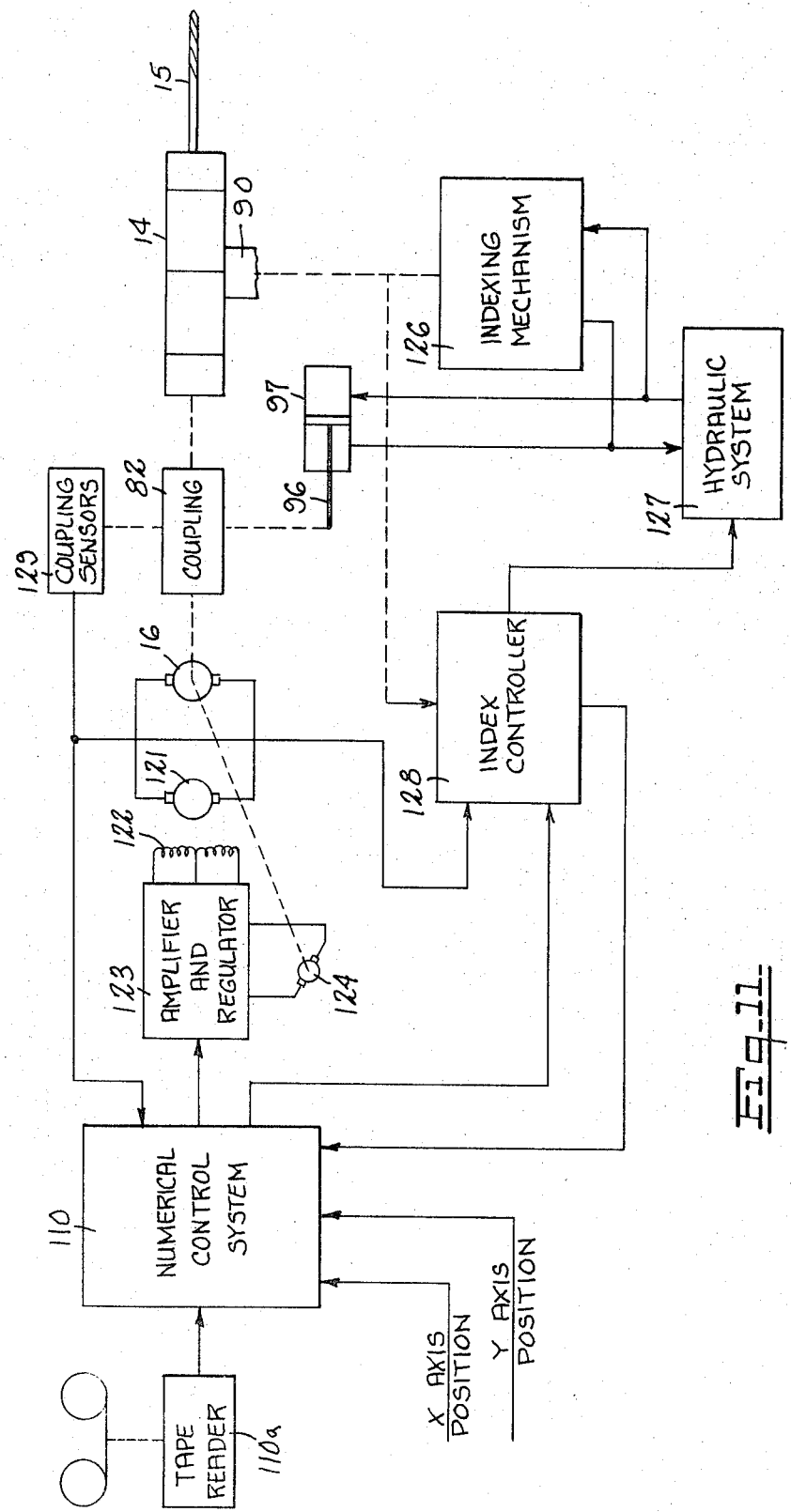

TURRET LATHE

This application is a division of application Ser. No. 125,162 filed Mar. 17, 1971, now U.S. Pat. No. 3,750,244.

This invention relates to turret lathes and more particularly relates to improvements in a turret lathe capable of performing the functions of drilling, milling and tapping with power driven tools from the turret faces in the same setup.

With the advent of numerical controls for machine tools, it has been found necessary to produce fresh designs of macine tools so that the cutting tools and motions thereof may be properly programmed with relation to other parts of the machine. U.S. Pat. No. 3,486,209 to Robert S. Jones and Walter Shultz discloses a turret lathe wherein both end working tools and peripheral turning tools are mounted in spacial relation to the same slide, and the slide is positionable in accordance with the cutting program. Co-pending application Ser. No. 125,163 filed on the same date as this application (DeLio and Montgomery Docket No. 8850) and now abandoned discloses a three-axes turret lathe where the workholding chuck of the machine may be rotated at a predetermined feed rate while the end tools are working thereon to develop cam surfaces and other irregular configurations under the command of a pre-prepared program.

The present invention provides new and improved drive and positioning means for a machine of the type described wherein a single motor may be utilized to drive the various end working tools carried in a turret, and new and improved means are provided to index and also rotate the workholding chuck at a feed speed for a cutting operation to be performed thereon.

An object of this invention is to provide a new and improved mechanism for powering a plurality of tools in a turret from a single drive means.

Another object of this invention is to provide such a turret and drive means for the end working tools of a lathe in combination with new and improved means for indexing the lathe spindle and/or driving the spindle at a predetermined feed rate.

Another object of this invention is to provide new and improved means for indexing the spindle of a lathe from a zero reference point, and also for driving the spindle at a predetermined feed speed.

A further object of this invention is to provide a new and improved lathe having various individually powered end working tools, which are movable along a predetermined path to cut a predetermined contour on a workpiece in the lathe chuck moving at a predetermined feed speed.

The features of the invention which are believed to be novel are particularly pointed out and distinctly claimed in the concluding portion of this specification. The invention, however, both as to its operation and organization, together with further objects and advantages thereof may best be appreciated by reference to the following detailed description taken in conjunction with the drawings, wherein:

FIG. 7 is a plan view of the end tool turret of the machine with portions thereof cut away to show interior parts;

FIG. 8 is a view seen in the plane of lines 8—8 of FIG. 7;

FIG. 9 is a view seen in the plane of lines 9—9 of FIG. 8;

FIG. 11 is a diagram, partly schematic and partly in block form showing the control of the operation of the end tool turret;

FIG. 12 is a diagram, partly schematic and partly in block form showing a drive for the tool axis.

FIGS. 13 and 13a show an irregular shaped workpiece which may be produced in a lathe embodying the invention; and FIG. 14 shows the end working turret in relation to the workpiece for performing a multiplicity of machining operations thereon.

Figure 1:
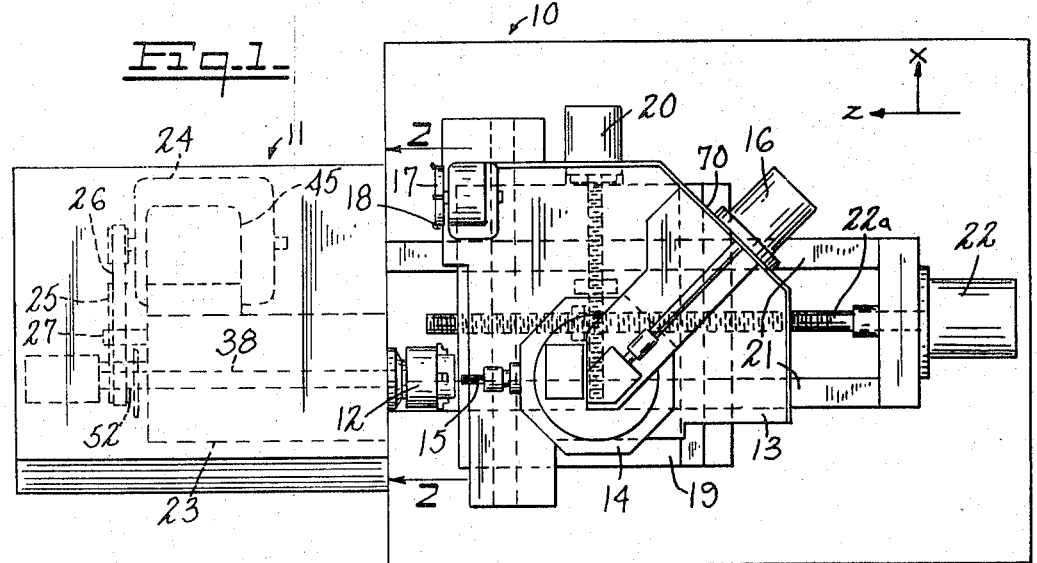
FIG. 1 is a plan view of a turret lathe in which the invention may be embodied.

A machine 10 embodying the invention includes a head stock portion 11 having a drive means adapted to rotate or index a workholding member such as a face plate or a chuck 12 adapted to hold a workpiece. The working tools are carried on a slide 13 which has thereon a rotatable turret 14 adapted to receive a plurality of end working tools as exemplified at 15. As hereinafter explained, the tools 15 are driven by a single motor 16. Turret 14 is indexable to present any selected tool thereon to a workpiece in chuck 12. Also carried on slide 13 is a turret 17 having a plurality of turning tools 18. Member 13 is movable in the X-axis as shown in FIG. 1 on a slide 19 by means of a positioning and feed motor 20. Slide 19 is further movable along the Z-axis on a pair of rails or ways 21 by a positioning and feed motor 22.

As thus far described, slide 13 is positionable along the X or Z axis to present either an end working tool 15 to a workpiece in chuck 12, or to present a turning tool to the periphery of a workpiece in chuck 12 while the turret 14 is in remote spacial relation.

Figure 2:
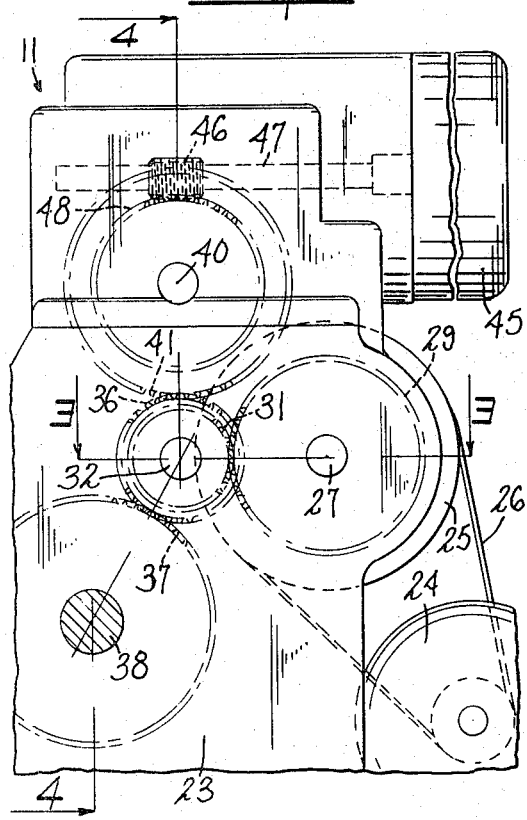
FIG. 2 is a view of the head stock drive of the machine of FIG. 1 seen in the plane of lines 2—2 of FIG. 1.
Figure 3:
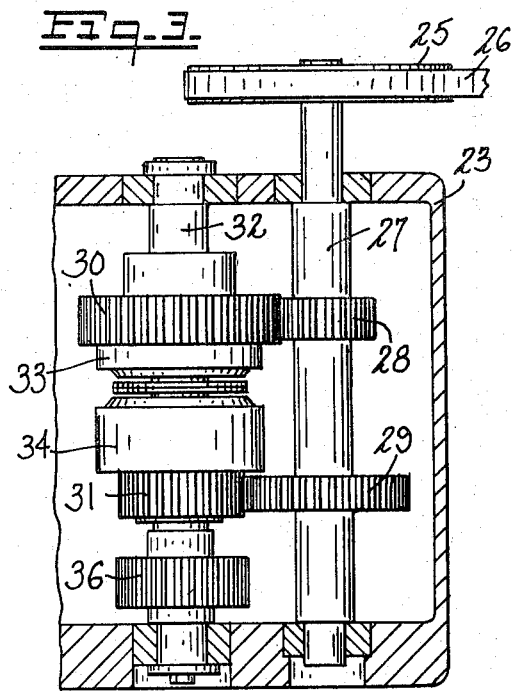
FIG. 3 is a view seen in the plane of lines 3—3 of FIG. 2.

The various drives for the chuck are shown in FIGS. 2 and 3. A variable speed motor 24 drives a pulley 25 via a belt 26 on shaft 27 rotatably mounted in headstock housing 23. Mounted to shaft 27 are gears 28 and 29 which mesh with gears 30 and 31, respectively, clutchable to a shaft rotatably mounted in the headstock housing. Also disposed on shaft 32 are clutches 33 and 34 in cooperative relation with gears 30 and 31, respectively. Clutches 33 and 34 are of the electromagnetic or hydraulically actuated type adapted to clutch their respective gears to shaft 32. When clutch 34 is energized, shaft 32 will be driven in a high speed range. When clutch 33 is energized, shaft 32 will be driven in a low speed range. Motor 24 is a variable speed-regulated motor which will operate at a commanded speed to operate a spindle and chuck during a turning operation.

Figure 4:
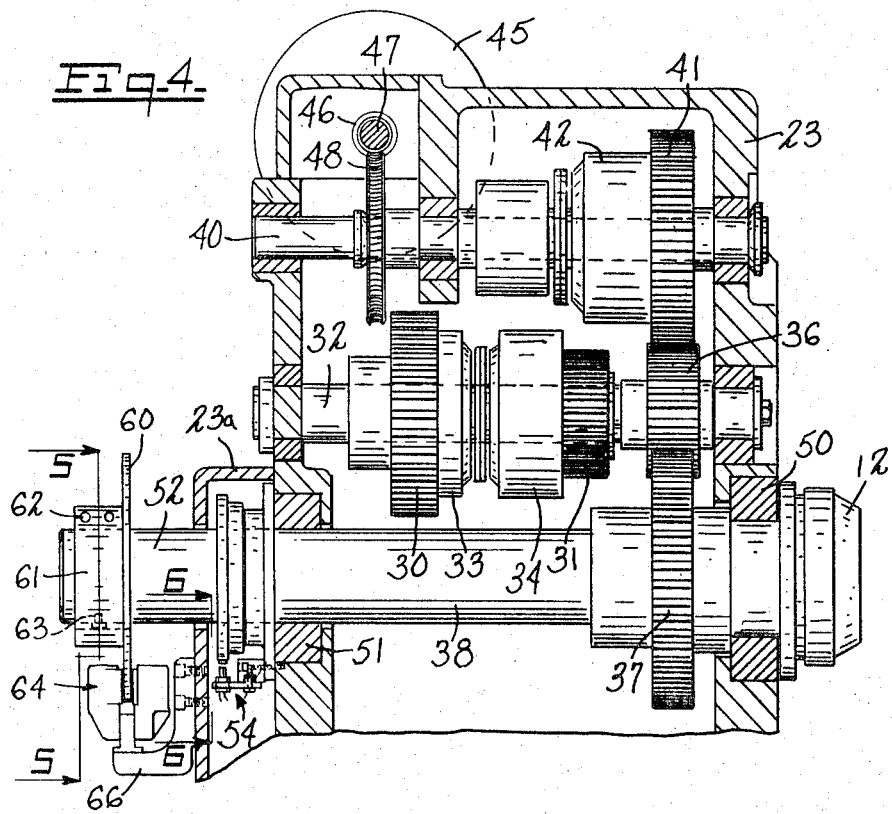
FIG. 4 is a view seen in the plane of lines 4—4 of FIG. 2.
Figure 5:
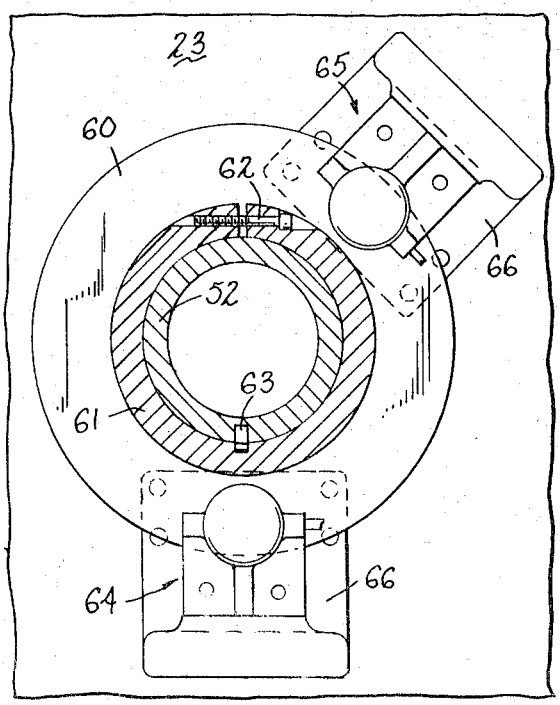
FIG. 5 is a view seen in the plane of lines 5—5 of FIG. 4.

Another gear 36 on shaft 32 is in meshing relation with gear 37 on a spindle shaft 38 (FIG. 4), rotatably mounted in housing 23. With this arrangement shaft 38 may be rotated throughout a wide speed range, dependent on the speed of motor 24 and energization of clutches 33 and 34.

Spindle shaft 38 is also arranged to be indexed or driven at a predetermined feedrate so that an end working tool 15 may perform a shaping or milling operation on a workpiece in chuck 12. Another shaft 40 is rotatably carried in housing 23 and has thereon a gear 41-clutch 42 assembly adapted to clutch gear 41 to shaft 40. Clutch 42 is of the electromagnetic or hydraulically actuated type adapted to connect gear 41 to shaft 40 when energized. An indexing and feed motor 45 carries a worm 46 on the shaft 47 thereof, which drives worm gear 48 on shaft 40. When motor 45 and also clutch 42 are energized, motor 45 will drive spindle 38 through shaft 40 and gears 41, 36 and 37.

Spindle shaft 38 is journalled in frame 23 at bearings 50 and 51. Spindle shaft 38 further has an extension 52 beyond frame 23. Mounted to shaft portion 52 is a reference positioning device 54 having thereon a magnetic indicating element 55 thereon. Magnetic sensors 56 and 57 are mounted to a bracket 58 carried on housing 23.

Figure 6:
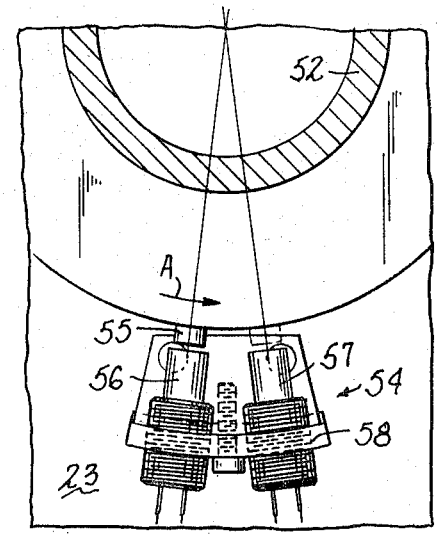
FIG. 6 is a view seen in the plane of lines 6—6 of FIG. 4.

The purpose of this arrangement is to set an automatic zero reference position for spindle shaft 38, from which various angular positions of the shaft may be predetermined. As hereinafter more fully described when an automatic zero position of the spindle is commanded, the spindle will rotate in the direction of arrow A, FIG. 6, at a first feed speed until the ferrous indicator 55 is sensed by sensor 56. At this time a signal is transmitted to the control which decreases the feedrate of shaft 38 to a very low value. When indicator 55 reaches the second sensor 57, the feed is stopped. At this point, the angular position of spindle shaft 38 is at the zero reference position.

Braking means are also provided on shaft 38. A brake disc 60 having a collar 61 is affixed to shaft portion 52 by means of a clamping bolt 62 and a key 63. Braking assemblies 64 and 65 are carried on brackets 66 affixed to housing portion 23a. The braking assemblies are electromagnetically or hydraulically operated disc-engaging units adapted to frictionally engage disc 60 and provide either a retarding force or a full braking effect as hereinafter described.

Briefly summarized, the shaft 38 may be driven in speed ranges for turning operations through shaft 32 and gears 36 and 37 may be operated in feed and index speed range through shaft 40 so as to have relative movement with respect to an end cutting tool as hereinafter described.

Reference is now made to FIGS. 7, 8 and 9 which show the turret for end cutting tools. In the embodiment shown, the turret 14 is octagonal and is adapted to receive different tools suitably mounted in tool holders. The turret 14 is rotatably mounted to the machine in a conventional manner and is indexable as hereinafter described, but each tool is adapted to be driven from a common drive means which comprises drive motor 16 carried on an upstanding bracket 70 of the main tool slide 13. Motor 16 through a shaft 71 and coupling 72 drives a gear 73 having its teeth pitched at an angle approximately 45 degrees as shown. Gear 73 is mountd within a housing 74 having a depending support 75. A shaft 76 providing a slide guide 77, and a journal 78 for an idler gear 79 is carried in support 75. A second shaft 80 carrying a gear 81 is rotatably mounted in support 75. A coupling member 82 having internal coupling splines 83 is splined to extension 84 of shaft 80 as indicated by the refernece numeral 85. Member 82 is rotatable with and longitudinally movable on shaft extension 84.

Housing 74 is carried on a closure member 86 on top of turret 14, and sealing means 87 are provided therebetween. An annular retainer 88 is positioned on turret 14 about member 86, and a cover member 89, indicated in broken line, may be provided. The turret rotates beneath closure 86, about the axis of turret shaft 90 rotatably supported in slide 13.

Slidably mounted on guide 77 is a yoke member 92 having arms 93 each carrying finger-like elements 94 received in an annular groove 95 in coupling 82. Yoke 92 moves coupling 82 between coupled and uncoupled positions under the action of a double-acting piston 96 in a hydraulic cylinder 97. In a coupled position splines 83 of member 82 engage splines 99 on a spindle 100 at each of the tool positions in turret 14. The spindles 100 have an internally tapered socket 101 adapted to receive the complimentary tapered portion of a tool holder 102 mounting a tool 15 in a conventional construction.

Yoke member 92 at the upper portion thereof carries a generally Z-shaped switch actuator 104 adapted to actuate either of limit switches 105 or 106 to indicate the position of yoke 92 to thus indicate whether the tool drive is coupled to a tool or not.

With this arrangement it is possible to drive any one of the tools in the turret from a common drive means.

Upon command, the piston 96 will either connect or disconnect the coupling member 82 from the tool spindle splines 99. Upon disconnection, which may be under control of a program, the turret may be rotated or indexed to a given position and piston 96 actuated in the opposite direction to couple coupling member 82 to the spindle drive for the newly positioned tool. The relative condition of switches 105 and 106 will signify the coupling condition.

Figure 10:
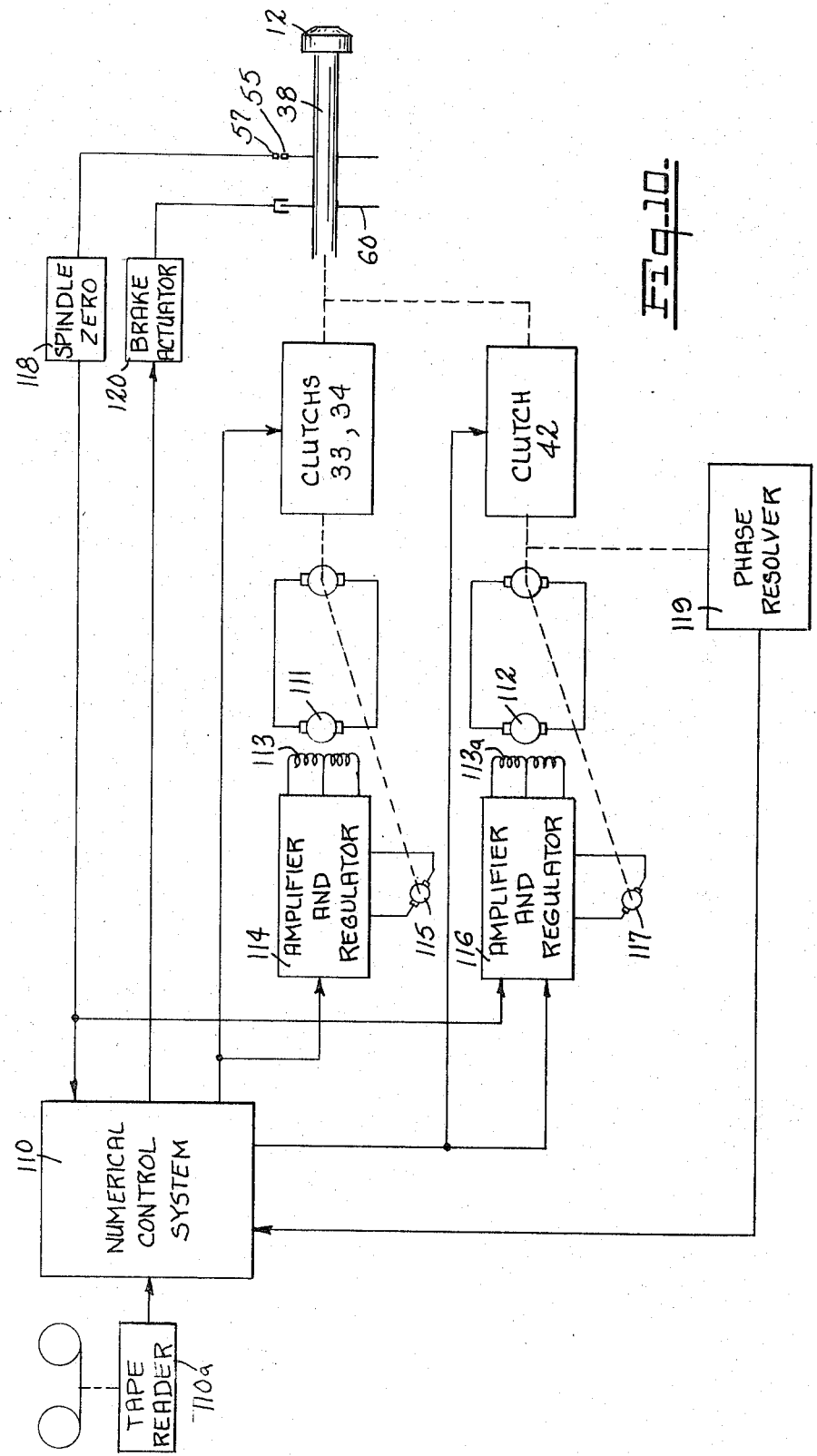
FIG. 10 is a diagram, partly schematic and partly in block form showing the control of the operations of the spindle and chuck.

FIG. 10 illustrates partly in schematic form and partly in block form the control of the operation of spindle drive motors 24 and 25.

The operation of the entire machine is generally under the control of a program which is carried out through a numerical control system, generally indicated by the reference numeral 110 which includes a reader 110a adapted to read encoded commands from an input tape T. Such control systems are generally available from a plurality of manufacturers. One suitable numerical control machine of the type described is a Model 913 of Bendix Corporation. Such control is disclosed in U.S. Pat. Nos. 3,002,115 and 3,278,817. The variable speed regulated motors 24 and 45 each receive electrical energy from direct current generators 111 and 112 having field windings 113 and 113a, respectively. The generators 111 and 112 are preferably driven by an AC motor (not shown) adapted to receive power at the point of installation. The fields 113 of motor 111 are controlled through an amplifier and speed regulator 114 which receives a motor speed feedback signal from a tachometer 115 to regulate the commanded speed of motor 24. The output of generator 112 is controlled in the same manner with a speed feedback signal from tachometer 117 The turning speed of spindle 38 is determined through a command from the numerical control system which at the same time will provide energization of the appropriate one of clutches 33 and 34 during the conventional turning operations. When the machine is to be operated to index the spindle to a predetermined position or to angularly feed the workpiece in the chuck 12, clutches 33 and 34 are de-energized and clutch 42 is energized. At this time, spindle 38 will be driven from motor 45 until magnetic sensors 56 and 57 first supply an input signal to amplifier and regulator 116 to first decrease the speed of spindle 38 and then halt motor 45 when the quill reaches the automatic zero reference position as signified by a spindle zero position logic 118 responsive to sensor 56. The logic 118 may merely be a switching network wich is responsive to the proximity of indicator 55 to sensor 57. If the next command is to index the chuck 12 to a given angular position a command will be given to amplifier and regulator 116 with clutch 42 energized to begin rotation of spindle 38. Such command in the conventional numerical control system may be signified or reported by a pulse train wherein the number of pulses indicates the distance of angle of movement and the rate of the pulses indicates the speed. These pulses are generally indicated in a register known as a command counter and compared with pulses derived from a shaft rotation quantizer or a phase resolver 119 which measures the angular movement of a shaft. The resolver 119 has a voltage output, the phase of which is dependent upon the position of the rotor relative to stator windings. This sine wave may be converted to a square wave and compared with the command pulses to measure the difference between the commanded position and the actual position. An error signal is then derived and utilized to drive the controlled member until the error is eliminated. A numerical control servo system using a phase resolver is disclosed in U.S. Pat. No. 3,011,110.

The spindle will index to the commanded position at which time the numerical control 110 will sense this and apply a signal to the brake actuator 120 to energize the spindle disc brakes 64 and 65.

Alternatively, spindle 38 may be operated at a low feed speed while one of the end cutting tools 15 is performing a machining operation thereon such as cutting a cam contour. In such operation, the spindle 38 will be returned to its automatic zero reference position and a feed speed command will be applied from the numerical control to amplifier and regulator 116 while clutch 42 is energized. The chuck 12 carrying the workpiece will then have angular movement at a predetermined speed for a predetermined angle while the slide 13 moves turret 14 and a predetermined tool 15 therein in timed relation with the feed rotation of spindle 38 and chuck 12.

FIG. 11 exemplifies partly in schematic form and partly in block form the control of turret 14 and the driving of tools therein. In the operation of the network of FIG. 11 the tool drive motor 16 drives a tool 15 in turret 14 at a speed dependent upon the output of a generator 121, whose output is controlled by the excitation of field windings 122 through an amplifier and regulator 123 which also receives the speed feedback from motor driven tachometer 124. Generator 121 which is driven from an AC motor (not shown) operates motor 16 at a speed determined by an input from the numerical control 110.

Turret 14 is positioned by an indexing mechanism which is energized from a hydraulic system 127 upon command from an index controller or logic 128 upon command of the numerical control system 110. Such controller may also receive an interlock signal from a coupling sensor 129 which is the limit switches 105 and 106 and the actuator 104 therefor (FIGS. 7 and 8). This determines whether the coupling member 82 is connected to a turret spindle. When such connection is present, coupling sensor 129 may apply an appropriate signal to the numerical control, and also a signal to controller 128 to disable turret motor 16. In a like manner if the sensor 129 determiens that no coupling is in effect controller 128 is enabled to operate the indexing mechanism. When the turret 14 has been properly indexed, coupling sensor 129 will then furnish a signal to numerical control 110 which indicates that a coupling has been made. Then a signal will be applied to amplifier and regulator 123 to commence operation of motor 16. In addition, the control 110 will be arranged such that the signal to amplifier and regulator 123 to commence operation of motor 16 will not be given until the slide 13 is in a predetermined position with respect to the X and Z axes, as will be determined by the drives to those axes. A preferred indexing mechanism and controller therefor is shown in U.S. Pat. No. 3,593,597 assigned to the same assignee as this application, (Ser. No. 681,238, filed Nov. 7, 1967).

This patent discloses a turret and indexing and control mechanism wherein the turret is normally in a locked condition resting on and coupled to a stationary face-type coupling ring. Upon command, the turret raises slightly to disengage from the coupling, and then angularly indexes to a commanded position. The basic movements of the turret are developed from hydraulic drive means, while position sensing and locating is performed electrically. The disclosure of this patent is incorporated herein by reference.

FIG. 12 exemplifies an axis drive and is exemplary of the drive for either the X or Z axes. In operation, in the Z axes motor 22 drives lead screw 22a which moves slide 19 and main slide 13 thereon in the Z direction. Motor 22 is driven at a speed determined by the energization of the field windings 131 of a generator 132. The field windings 131 are excited through an amplifier and regulator 133 upon a command from the numerical control system. The amplifier and regulator 133 also receives a feedback signal from tachometer 134. A phase resolver 135 is coupled to lead screw 22a and furnishes a signal which is utilized to indicate a position error as heretofore described.

The motor 22 may operate at a high speed to traverse the slide 19 or may be operated at a lower feed speed for drilling, tapping, boring and/or milling a workpiece in the chuck 12.

It will be understood that the control of motor 20 which determines the movement and feed in the X axis will be the same as that shown in FIG. 12.

Means are also provided for indexing the turret 17. The control for the indexing position of turret 17 may take the same form as that for the turret 14 and hence is not separately shown.

FIGS. 13a and 13b show a front view and side view, respectively, of a cam which may be cut on a machine embodying the invention in less than 10 minutes and FIG. 14 shows the relationship of the workpiece to the turning tools used in the lathe mode and the turret 14 when used in the production mode.

In the lathe mode the tools on turret 17 will first rough turn the periphery A and face the surface B. Then form C is cut and turned.

At this time, the numerical control 110, from directions on the programmed tape will apply a signal to amplifier and regulator 116 to operate motor 45 to turn the spindle at a low speed while clutch 42 is energized to bring the spindle to the zero reference position. The spindle is first slowed down when indicator 55 passes sensor 57 (FIGS. 6 and 10) and then the spindle is stopped when indicator 55 zeros in on sensor 57.

The slide 13 will then be positioned along the X and Z axes at a predetermined position through the drives shown in FIG. 12, the turret is indexed to the first location II and the coupler 82 is moved into engagement with the spindle of tool II. Tool II will then be powered and slide 13 will feed in the Z axis to drill holes D and E in the face B. Prior to such drilling operations, the workpiece is indexed at the proper angular position and slide 13 is moved appropriately in the X and Z axes. During such drilling operation, brakes 64 and 65 will engage the spindle disc 60.

After holes D and E are drilled the slide 13 will be moved back in the Z axes, coupler 82 will be withdrawn from the spindle of tool II and the turret will index to present tool III to the workpiece. Coupler 82 is then actuated to connect the spindle of tool III to the drive motor and tool III will operate to deburr the holes D and E after the spindle is appropriately indexed.

The slide 13 is then backed away from the work and indexes to present tool IV, a tapping tool, to the workpiece.

Coupler 82 is moved into engagement with the spindle for tool IV and the spindle indexing control together with the motor 16 are operated to tap the holes D and E.

After the tapping, slide 13 withdraws turret 14 and indexes to present tool V to the workpiece. The spindle is indexed to locate hole F for drilling, slide 13 is appropriately moved in the X axis position in the Y axis and then moved in at the predetermined feedrate to drill hole F.

Subsequently, tool VI is indexed to be presented to the workpiece and hole F is deburred.

Turret 14 is then indexed to present tool VII, the spindle is brought back to a zero reference position, the spindle is now opdq[sed through motor 42 at a predetermined feedrate as slide 13 moves in the X and Z axes with tool VII powered to produce a cutting opertion through periphery A and produce the cam contour shown in FIG. 13a. At the conclusion of operation in this machining mode, the turret 14 is indexed twice to bring turret face I to the work position to commence operation on a new workpiece.

The finished cam is then removed from the lathe requiring no further machining operations. It has been found that a cam as shown in FIGS. 13a and 13b where the periphery A has an initial diameter of 5 inches may be completely finished in less than 9 minutes.

While the turret 13 has been exemplified as carrying rotating cutting tools, one or more turret faces may be constructed to receive non-rotatable face turning tools.

It may thus be seen that the objects of the invention set forth as well as those made apparent from the foregoing description are efficiently attained. While various embodiments of the invention have been set forth for purposes of disclosure other embodiments of the invention as well as modifications to the disclosed embodiments thereof may occur to those skilled in the art. Accordingly, the appended claims are intended to cover all embodiments of the invention as well as modifications to the disclosed embodiment thereof which do not depart from the spirit and scope of the invention.

What is claimed is:

1. In a machine tool having a turret adapted to present one of a plurality of tools to a working position, a plurality of angularly disposed tool receiving spindles carried in said turret, said spindles having axes residing in a common plane, means rotatably mounting said turret with respect to said drive means, a support means extending vertically into said turret from the top thereof, a spindle drive shaft rotatably mounted in said support means and carrying coupling means thereon movable into and out of driving engagement with a spindle in the working position, means for moving said coupling means into and out of driving engagement with a spindle in the working position, spindle drive means, and means on said support means connecting said drive means to said drive shaft.

2. The arrangement of claim 1 further including means for indicating the coupling state of said coupling means.

3. The arrangement of claim 1 wherein said drive shaft carries a gear at one end thereof, and said coupling means is splined to the other end thereof, said connecting means including a second gear rotatably supported by said support means for driving said first gear from said drive means.

4. The arrangement of claim 1 wherein said coupling member and each of said spindles have splines defined thereon to establish a driving connection between said coupling member and said spindles.

5. The arrangement of claim 3 further including a second shaft carried in said support means and mounting said second gear thereon at one end thereof, said second shaft having a guide on the other end thereof, and means slidable on said guide for moving said coupling member on said drive shaft.

* * * * *

PO-1050
(5/69)

UNITED STATES PATENT OFFICE
CERTIFICATE OF CORRECTION

Patent No. 3,845,532                    Dated November 5, 1974

Inventor(s) William R. Smith

It is certified that error appears in the above-identified patent and that said Letters Patent are hereby corrected as shown below:

Column 1, lines 22 and 23, delete "(DeLio and Montgomery Docket No. 8850)". Column 2, line 24, "FIGS. 13 and 13a" should read -- FIGS. 13a and 13b --.
Column 3, last line, "mountd" should read -- mounted --.
Column 4, line 53, after "tape" delete "T".
Column 6, line 15, "determiens" should read -- determines --.
Column 7, line 50, "opdq[sed" should read -- operated --.
Column 7, line 52, "opertion" should read -- operation --.
Column 8, line 46, "claim 1" should read -- claim 3 --.

Signed and sealed this 1st day of April 1975.

(SEAL)
Attest:

RUTH C. MASON
Attesting Officer

C. MARSHALL DANN
Commissioner of Patents
and Trademarks